US008938872B2

(12) United States Patent
Katter

(10) Patent No.: US 8,938,872 B2
(45) Date of Patent: Jan. 27, 2015

(54) ARTICLE COMPRISING AT LEAST ONE MAGNETOCALORICALLY ACTIVE PHASE AND METHOD OF WORKING AN ARTICLE COMPRISING AT LEAST ONE MAGNETOCALORICALLY ACTIVE PHASE

(75) Inventor: Matthias Katter, Alzenau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 966 days.

(21) Appl. No.: 13/058,841

(22) PCT Filed: Oct. 1, 2008

(86) PCT No.: PCT/IB2008/054004
§ 371 (c)(1), (2), (4) Date: Feb. 11, 2011

(87) PCT Pub. No.: WO2010/038098
PCT Pub. Date: Apr. 8, 2010

(65) Prior Publication Data
US 2011/0151230 A1 Jun. 23, 2011

(51) Int. Cl.

| | |
|---|---|
| ***B23P 25/00*** | (2006.01) |
| ***H01F 1/01*** | (2006.01) |
| ***H01F 1/057*** | (2006.01) |
| ***C22C 38/00*** | (2006.01) |
| ***C22C 38/02*** | (2006.01) |
| ***C22C 38/10*** | (2006.01) |
| *B22F 3/12* | (2006.01) |

(52) U.S. Cl.
CPC .............. *H01F 1/015* (2013.01); *H01F 1/0577* (2013.01); *C22C 38/005* (2013.01); *C22C 38/02* (2013.01); *C22C 38/10* (2013.01); *B22F 3/12* (2013.01)
USPC ............................................................ 29/458

(58) Field of Classification Search
USPC .................. 29/458, 412, 417, 426.1; 252/67, 252/62.51 R; 219/69.17, 121.71, 121.72; 451/28, 36; 428/220; 62/3.1
See application file for complete search history.

(56) References Cited

U.S. PATENT DOCUMENTS

| | | | |
|---|---|---|---|
| 428,057 | A | 5/1890 | Tesla |
| 3,841,107 | A | 10/1974 | Clark |
| 4,112,699 | A | 9/1978 | Hudson, III et al. |

(Continued)

FOREIGN PATENT DOCUMENTS

| | | | |
|---|---|---|---|
| DE | 103 38 467 | A1 | 3/2004 |
| DE | 10330574 | | 6/2004 |

(Continued)

OTHER PUBLICATIONS

JP2011529642, Notice of Reasons for Rejection from JPO (English Translation included), dated Oct. 2, 2012, 2pgs.

(Continued)

*Primary Examiner* — John C Hong
(74) *Attorney, Agent, or Firm* — Dickinson Wright PLLC

(57) ABSTRACT

A method of working an article includes providing an article containing at least one magnetocalorically active phase having a magnetic phase transition temperature $T_c$ and removing at least one portion of the article while the article remains at a temperature above the magnetic phase transition temperature $T_c$ or below the magnetic phase transition temperature $T_c$.

20 Claims, 2 Drawing Sheets

(56) References Cited

U.S. PATENT DOCUMENTS

| | | | |
|---|---|---|---|
| 4,322,257 | A | 3/1982 | Menth et al. |
| 4,332,135 | A | 6/1982 | Barclay et al. |
| 4,849,017 | A | 7/1989 | Sahashi et al. |
| 6,446,441 | B1 | 9/2002 | Dean |
| 6,588,215 | B1 | 7/2003 | Ghoshal |
| 6,676,772 | B2 | 1/2004 | Saito et al. |
| 6,826,915 | B2 | 12/2004 | Wada et al. |
| 7,063,754 | B2 | 6/2006 | Fukamichi et al. |
| 7,076,959 | B2 | 7/2006 | Lewis |
| 7,168,255 | B2 | 1/2007 | Saito et al. |
| 7,186,303 | B2 | 3/2007 | Kogure et al. |
| 7,670,443 | B2 | 3/2010 | Kogure et al. |
| 7,695,574 | B2 | 4/2010 | Nakajima |
| 7,914,628 | B2 | 3/2011 | Tsuji et al. |
| 8,037,692 | B2 | 10/2011 | Muller et al. |
| 2004/0079446 | A1 | 4/2004 | Kogure et al. |
| 2004/0093877 | A1 | 5/2004 | Wada et al. |
| 2004/0182086 | A1 | 9/2004 | Chiang et al. |
| 2004/0194855 | A1 | 10/2004 | Fukamichi et al. |
| 2004/0261420 | A1 | 12/2004 | Lewis |
| 2005/0172643 | A1 | 8/2005 | Lewis |
| 2006/0005898 | A1 | 1/2006 | Liu et al. |
| 2006/0076084 | A1 | 4/2006 | Nakajima |
| 2006/0213580 | A1 | 9/2006 | Tsuji et al. |
| 2006/0218936 | A1 | 10/2006 | Kobayashi et al. |
| 2006/0231163 | A1 | 10/2006 | Hirosawa et al. |
| 2007/0137732 | A1 | 6/2007 | Kogure et al. |
| 2007/0218319 | A1 | 9/2007 | Ohkoshi et al. |
| 2007/0220901 | A1 | 9/2007 | Kobayashi et al. |
| 2008/0078184 | A1 | 4/2008 | Saito et al. |
| 2008/0078476 | A1 | 4/2008 | Saito et al. |
| 2010/0037625 | A1 | 2/2010 | Katter |
| 2010/0047527 | A1 | 2/2010 | Katter |
| 2010/0116471 | A1 | 5/2010 | Reppel et al. |
| 2010/0129794 | A1 | 5/2010 | Fabis et al. |
| 2011/0048690 | A1 | 3/2011 | Reppel et al. |
| 2011/0140031 | A1 | 6/2011 | Katter et al. |
| 2011/0168363 | A9 | 7/2011 | Reppel et al. |
| 2011/0198069 | A1 | 8/2011 | Katter et al. |

FOREIGN PATENT DOCUMENTS

| | | | |
|---|---|---|---|
| DE | 10 2006 015 370 | A1 | 10/2006 |
| DE | 112007003401 | | 1/2010 |
| EP | 0 187 538 | A2 | 7/1986 |
| EP | 0 217 347 | B1 | 2/1993 |
| EP | 1 867 744 | A1 | 12/2007 |
| EP | 1 463 068 | B1 | 2/2009 |
| GB | 1076036 | | 7/1967 |
| GB | 2 424 901 | A | 10/2006 |
| GB | 2 458 039 | A | 9/2009 |
| GB | 2 459 066 | A | 10/2009 |
| GB | 2 460 774 | A | 12/2009 |
| JP | 60204852 | A | 10/1985 |
| JP | 62243377 | A | 10/1987 |
| JP | 63-055906 | | 3/1988 |
| JP | 02-190402 | | 7/1990 |
| JP | 4-338604 | A | 11/1992 |
| JP | 4-338605 | A | 11/1992 |
| JP | 7-320918 | A | 12/1995 |
| JP | 2000-54086 | | 2/2000 |
| JP | 3082195 | | 8/2000 |
| JP | 2000-274976 | A | 10/2000 |
| JP | 2002-69596 | | 3/2002 |
| JP | 2002-356748 | A | 12/2002 |
| JP | 2003-28532 | A | 1/2003 |
| JP | 2003096547 | | 4/2003 |
| JP | 2005015911 | | 1/2005 |
| JP | 2005-036302 | A | 2/2005 |
| JP | 2005-93729 | | 4/2005 |
| JP | 2005-113209 | | 4/2005 |
| JP | 2005-120391 | A | 5/2005 |
| JP | 2005200749 | | 7/2005 |
| JP | 2005226124 | | 8/2005 |
| JP | 2006-89839 | A | 4/2006 |
| JP | 2006124683 | A | 5/2006 |
| JP | 2006-283074 | A | 10/2006 |
| JP | 2007-031831 | A | 2/2007 |
| JP | 2007031831 | | 2/2007 |
| JP | 2007-084897 | A | 4/2007 |
| JP | 2007-281410 | A | 10/2007 |
| JP | 2007291437 | A | 11/2007 |
| JP | 2008088474 | | 4/2008 |
| JP | 2008150695 | | 7/2008 |
| JP | 2005-226125 | | 8/2008 |
| JP | 2008214733 | | 9/2008 |
| JP | 2009-249702 | A | 10/2009 |
| WO | WO 93/25857 | | 12/1993 |
| WO | WO 00/45397 | A1 | 8/2000 |
| WO | WO 2004/019379 | A2 | 3/2004 |
| WO | WO 2005/066980 | A2 | 7/2005 |
| WO | WO 2006/074790 | A1 | 7/2006 |
| WO | WO 2007/026062 | A1 | 3/2007 |
| WO | WO 2007/065933 | A1 | 6/2007 |
| WO | WO 2008/099234 | A9 | 8/2008 |
| WO | WO 2008/099235 | A1 | 8/2008 |
| WO | WO 2009/090442 | A1 | 7/2009 |
| WO | WO 2010/038098 | A1 | 4/2010 |
| WO | WO 2010/128357 | A1 | 11/2010 |

OTHER PUBLICATIONS

Examination Report under Section 18(3) corresponding to GB Application No. 1015392.2 dated Sep. 14, 2011.

Form PCT/IB/326; Form PCT/IB/373 and Form PCT/ISA/237 corresponding to PCT/IB/ 2009/051854 dated Nov. 17, 2011.

Notice of Reasons for Rejection corresponding to JP 2010-511750 dated Sep. 13, 2011.

Japanese Office Action corresponding to JP Patent Application No. 2010-504885 dated Nov. 1, 2011.

An English Translation of the Office Action (First Examination Notice) dated Feb. 8, 2012, issued in Chinese Patent Application No. 2008800078121 corresponding to U.S. Appl. No. 12/526,199.

International Search Report mailed Jul. 8, 2009 for International Application No. PCT/IB2008/054004.

Written Opinion mailed Jul. 8, 2009 for International Application No. PCT/IB2008/054004.

Fujita, Asaya et al., "Giant Volume Magnetostriction due to the Itinerant Electron Metamagnetic Transition in La(Fe—Si)$_{13}$ Compounds," IEEE Transactions on Magnetics, vol. 35, No. 5, Sep. 1999, pp. 3796-3798.

Barrett, C.S., "Crystal Structure of Metals," *ASM Handbook*, Formerly Ninth Edition, Metals Handbook, vol. 9, ASM International, Materials Park, OH (1985), pp. 8-9.

Bulanova, M. V. et al., "Lanthanum-silicon System," *Journal of Alloys and Compounds* 329 (2001) (pp. 214-223).

Chang, H. et al., "Theoretical Study of Phase Forming of NaZn$_{13}$-type Rare-Earth Intermetallics," *J. Phys.: Condens. Matter*, vol. 15 (2003) pp. 109-120 XP002385787.

Fujieda, S. et al., "Enhancement of Magnetocaloric Effects in $La_{1-z}Pr_z(Fe_{0.88}Si_{0.12})_{13}$ and their Hydrides," *Journal of Applied Physics* 102, 023907 (2007) American Institute of Physics (5 pages).

Fujieda, S. et al., "Giant Isotropic Magnetostriction of Itinerant-Electron Metamagnetic $La(Fe_{0.88}Si_{0.12})_{13}H_y$ Compounds," Applied Physics Letters, vol. 79, No. 5, Jul. 30, 2001, pp. 653-655.

Fujieda, S. et al., "Large Magnetocaloric Effect in $La(Fe_xSi_{1-x})_{13}$ Itinerant-Electron Metamagnetic Compounds," *Applied Physics Letters*, vol. 81, No. 7, Aug. 12, 2002, American Institute of Physics (2002) pp. 1276-1278.

Fujieda, S. et al., "Strong Magnetocaloric Effects in $La_{1-z}Ce_z(Fe_{x-y}Mn_ySi_{1-x})_{13}$ at Low Temperatures," *Applied Physics Letters*, vol. 89, 062504 (2006) American Institute of Physics (3 pages).

Fujita, A. et al., "Control of Large Magnetocaloric Effects in Metamagnetic $La(Fe_xSi_{1-x})_{13}$ Compounds by Hydrogenation," *Journal of Alloys and Compounds* 404-406 (2005) pp. 554-558, Elsevier B.V. (5 pages).

Fujita, A. et al., "Giant Magnetovolume and Magentocaloric Effects in Itinerant-Electron Metamagnetic $La(Fe_xSi_{1-x})_{13}$ Compounds," *Materia Japan*, vol. 41, No. 4, Apr. 20, 2002, pp. 269-275.

(56) References Cited

OTHER PUBLICATIONS

Hu, F. X. et al., "Magnetic Entropy Change in La $(Fe_{0.98}Co_{0.02})_{11.7}Al_{1.3}$," *J. Phys.: Condens. Matter*, vol. 12 (2000) L691-696.

Hu, F. X. et al., "Magnetic Entropy Change and its Temperature Variation in Compounds $La(Fe_{1-x}Co_x)_{11.2}Si_{1.8}$," *Journal of Applied Physics*, vol. 92, No. 7, Oct. 1, 2002, American Institute of Physics (2002) pp. 3620-3623.

Ji, J. F. et al., "A Novel Technique for Manufacturing Metal-bonded Nd—Fe—B Magnets by Squeeze Casting," *Metallurgical and Materials Transactions A* (Physical Metallurgy and Material Science) ISSN 1073-5623, 2002, vol. 33, No. 3, pp. 637-646 (10p.) and Abstract of the same.

Katter, M. et al., "Magnetocaloric Properties of $La(Fe, Co, Si)_{13}$ Bulk Material Prepared by Powder Metallurgy," Vacuumschmelze GmbH and Company KG, *IEEE Transactions on Magnetics*, vol. 44, No. 11, Nov. 2008 (pp. 3044-3047).

Kneller, E., "Ferromagnetismus," Springer-Verlag, 1962 (1 page).

Mandal, K. et al., "Magnetocaloric Effect in Reactively-Milled $LaFe_{11.57}Si_{1.43}H_y$ Intermetallic Compounds," *Journal of Applied Physics* 102, 053906 (2007) American Institute of Physics (5 pages).

Massalski, Th.B., "Diagram 1074," Binary Alloy Phase Diagrams, Ed. J.L. Murray, L.H. Benett, H. Backer, American Society of Metals Ohio, (1986) 1074.

Massalski, Th.B., "Diagram 1108," Binary Alloy Phase Diagrams, Ed. J.L. Murray, L.H. Benett, H. Backer, American Society of Metals Ohio, (1986) 1108.

Otani, Y. et al., "Metal Bonded $Sm_2Fe_{17}N_{3-\delta}$ magnets," Department of Pure and Applied Physics, Trinity College, Dublin 2, Ireland, *J. Appl. Phys.* 69 (9), May 1, 1991, 1991 American Institute of Physics, pp. 6735-6737.

Richard, M.A. et al., "Magnetic Refrigeration: Single and Multimaterial active Magnetic Regenerator Experiments," *Journal of Applied Physics*, vol. 95, No. 4, Feb. 15, 2004, pp. 2146-2150, American Institute of Physics (6 pages).

Saito, A. T. et al., "Magnetocaloric Effect of New Spherical Magnetic Refrigerant Particles of $La(Fe_{1-x-y}Co_xSi_y)_{13}$ Compounds," *ScienceDirect, Journal of Magnetism and Magnetic Materials* 310 (2007) 2808-2810, www.sciencedirect.com (pp. 2808-2810).

Tishin, A.M. et al., "The Magnetocaloric Effect and its Applications," Institute of Physics Publishing, Bristol and Philadelphia, IOP Publishing Ltd. 2003, pp. 371-375.

Villars, P. et al., "Diagram 10375," *Handbook of Ternary Alloy Phase Diagrams*, $2^{nd}$ Ed., ASM International, 10 (1997) 10375 (1 page).

Villars, P. et al., "Diagram 8502," *Handbook of Ternary Alloy Phase Diagrams*, $2^{nd}$ Ed., ASM International, 7 (1997) 8502 (1 page).

Wang, J. et al., "The Hydrogenation Behavior of $LaFe_{11.44}Si_{1.56}$ Magnetic Refrigerating Alloy," *Journal of Alloys and Compounds*, vol. 485 (2009) pp. 313-315, Elsevier B.V. (3 pages).

Zhang, H. et al., "The Spike in the Relation Between Entropy Change and Temperature in $LaFe_{11.83}Si_{1.17}$ Compound," ScienceDirect, *Journal of Magnetism and Magnetic Materials* 320 (2008) 1879-1883, www.sciencedirect.com (pp. 1879-1883).

Zhang, X. X. et al., "Magnetic Entropy Change in Fe-based Compound $LaFe_{10.6}Si_{2.4}$," Applied Physics Letters, vol. 77, No. 19, Nov. 16, 2000, pp. 3072-3074 (2000) American Institute of Physics.

Zimm, C. et al., "Description and Performance of a Near-Room Temperature Magnetic Refrigerator," *Advances in Cryogenic Engineering*, vol. 43, Plenum Press, New York, (1998) pp. 1759-1766.

ARTICLE COMPRISING AT LEAST ONE MAGNETOCALORICALLY ACTIVE PHASE AND METHOD OF WORKING AN ARTICLE COMPRISING AT LEAST ONE MAGNETOCALORICALLY ACTIVE PHASE

BACKGROUND

1. Field

The application relates to an article comprising at least one magnetocalorically active phase and methods of working an article comprising at least one magnetocalorically active phase.

2. Description of Related Art

The magnetocaloric effect describes the adiabatic conversion of a magnetically induced entropy change to the evolution or absorption of heat. By applying a magnetic field to a magnetocalorically active material, an entropy change can be induced which results in the evolution or absorption of heat. This effect can be harnessed to provide refrigeration and/or heating.

Magnetic heat exchangers, such as that disclosed in U.S. Pat. No. 6,676,772, typically include a pumped recirculation system, a heat exchange medium such as a fluid coolant, a chamber packed with particles of a magnetic refrigerant working material which displays the magnetocaloric effect and a means for applying a magnetic field to the chamber.

Magnetic heat exchangers are, in principle, more energy efficient than gas compression/expansion cycle systems. They are also considered environmentally friendly as chemicals such as chlorofluorocarbons (CFC) which are thought to contribute to the depletion of ozone levels are not used.

In recent years, materials such as $La(Fe_{1-a}Si_a)_{13}$, $Gd_5(Si,Ge)_4$, Mn(As,Sb) and MnFe(P, As) have been developed which have a Curie temperature, $T_c$, at or near room temperature. The Curie temperature translates to the operating temperature of the material in a magnetic heat exchange system. These materials are, therefore, suitable candidates for use in applications such as building climate control, domestic and industrial refrigerators and freezers as well as automotive climate control.

Consequently, magnetic heat exchanger systems are being developed in order to practically realise the advantages provided by the newly developed magnetocalorically active materials. However, further improvements are desirable to enable a more extensive application of magnetic heat exchange technology.

SUMMARY

It is an object of the present application to provide an article and methods for producing an article comprising at least one magnetocalorically active phase for use in magnetic heat exchanger in a cost-effective and reliable manner.

A method of working an article comprising at least one magnetocalorically active phase having a Magnetic phase transition temperature $T_c$ is provided in which at least one portion of the article is removed whilst the article remains at a temperature above the magnetic phase transition temperature $T_c$ or below the magnetic phase transition temperature $T_c$.

This method of working an article comprising at least one magnetocalorically active phase may be used to further work a pre-fabricated article so as to, for example, singulate the article into two or more small articles and/or provide the desired manufacturing tolerances of the outer dimensions in a cost-effective and reliable manner.

Particularly in the case of working pre-fabricated articles having larger dimensions, for example blocks having dimensions of at least 10 mm or several tens of millimeters, the inventors observed that undesirable cracks were formed in the article during working which limited the number of smaller articles with the desired dimensions which could be produced from the larger pre-fabricated article.

The inventors further observed that this undesirable cracking can be largely avoided by performing the working so that the temperature of the article remains at a temperature above or below the Magnetic phase transition temperature.

The method used to fabricate the article comprising at least one magnetocalorically active phase may be selected as desired. Powder metallurgical methods have the advantage that blocks having large dimensions can be cost effectively produced. Powder metallurgical methods such as milling, pressing and sintering of precursor powders to form a reaction sintered article or milling of powders comprising the least portion of magnetocalorically active phase followed by pressing and sintering to form a sintered article may be used.

The article comprising at least one magnetocalorically active phase may also be produced by other methods such as casting, rapid solidification melt spinning and so on and then worked using the method according to the present invention.

A magnetocalorically active material is defined herein as a material which undergoes a change in entropy when it is subjected to a magnetic field. The entropy change may be the result of a change from ferromagnetic to paramagnetic behaviour, for example. The magnetocalorically active material may exhibit, in only a part of a temperature region, an inflection point at which the sign of the second derivative of magnetization with respect to an applied magnetic field changes from positive to negative.

A magnetocalorically passive material is defined herein as a material which exhibits no significant change in entropy when it is subjected to a magnetic field.

A magnetic phase transition temperature is defined herein as a transition from one magnetic state to another. Some magnetocalorically active phases exhibit a transition from antiferromagnetic to ferromagnetic which is associated with an entropy change. Some magnetocalorically active phases exhibit a transition from ferromagnetic to paramagnetic which is associated with an entropy change. For these materials, the magnetic transition temperature can also be called the Curie temperature.

In order to maintain the temperature of the article at a temperature above the magnetic phase transition temperature or below the magnetic phase transition temperature during working, the article may be heated whilst removing the portion of the article or cooled whilst removing the portion of the article.

Heating or cooling of the article may be performed by applying a heated or cooled working fluid such as water, an organic solvent or oil, for example.

In an embodiment, after the formation of the magnetocalorically active phase, the article is maintained at a temperature above its magnetic phase transition temperature $T_c$ until working of the article has been completed. This embodiment may be carried out by storing the article at temperatures above the magnetic phase transition temperature after the formation of the magnetocalorically active phase by heat treatment.

The article may be transferred from the furnace in which it is produced whilst the furnace is at a temperature above the magnetic phase transition temperature of the article to a warming oven held at a temperature above the magnetic phase transition temperature in a sufficiently short time such that the temperature of the article does not fall below the magnetic phase transition temperature. Similarly, the article is transferred from the warming oven to the working site whilst maintaining the temperature of the article above the magnetic phase transition temperature.

In further embodiments, the article is heated whilst removing the portion of the article so as to prevent the magnetocalorically active phase from undergoing a phase change or the article is cooled whilst removing the portion of the article so as to prevent the magnetocalorically active phase from undergoing a phase change.

The phase change may be a change in entropy, a change from ferromagnetic to paramagnetic behaviour or a change in volume or a change in linear thermal expansion.

Without being bound by theory, it is believed that a phase change occurring in a temperature region around the magnetic phase transition temperature may result in the formation of cracks within the article if, during working, the temperature of the article during working changes so that the article undergoes a phase change.

Performing the working of the article by removing one or more portions, whilst the article is maintained at a temperature at which the phase change does not occur, avoids the phase change occurring in the article during working and avoids any tension associated with the phase change occurring during working of the article. Therefore, the article may be worked reliably, the production quota increased and production costs reduced.

The portion of the article may be removed by any number of methods. For example, the portion of the article may be removed by machining and/or mechanical grinding, mechanical polishing and chemical mechanical polishing and/or electric spark cutting or wire erosion cutting.

A combination of these methods may also be used on a single article. For example, the article may be singulated into a two or more separate pieces by removing a portion of the article by wire erosion cutting and then the surfaces subjected to mechanical grinding removing a further portion to provide the desired surface finish.

The portion of the article may also be removed to form a channel in the surface of the article, for example, a channel for directing the flow of heat exchange medium during operation of the article in a magnetic heat exchanger. A portion of the article may also be removed to provide at least one through hole. A through hole may also be used to direct the flow heat exchange medium and to increase the effective surface area of the article so as to improve thermal transfer between the article and the heat exchange medium.

In a further embodiment, the article comprises a magnetocalorically active phase which exhibits a temperature dependent transition in length or volume. In this embodiment, the at least one portion is removed at a temperature above the transition or below the transition. The transition may occur over a temperature range which is larger than the temperature range over which a measurable entropy change occurs.

The transition may be characterized by $(L_{10}\%-L_{90}\%)\times 100/L>0.35$, wherein L is the length of the article at temperatures below the transition, $L_{10}\%$ is the length of the article at 10% of the maximum length change and $L_{90}\%$ at 90% of the maximum length change. This region characterizes the most rapid change in length per unit of temperature T. When normalized for temperature, the expression becomes $(L_{10}\%-L_{90}\%)\times 100/LT>0.2$.

In an embodiment, the magnetocalorically active phase exhibits a negative linear thermal expansion for increasing temperatures. This behaviour may be exhibited by a magnetocalorically active phase comprising a $NaZn_{13}$-type structure for example, a $(La_{1-a}M_a)(Fe_{1-b-c}T_bY_c)_{13-d}X_e$-based phase, wherein $0\le a\le 0.9$, $0\le b\le 0.2$, $0.05\le c\le 0.2$, $-1\le d\le +1$, $0\le e\le 3$, M is one or more of the elements Ce, Pr and Nd, T is one or more of the elements Co, Ni, Mn and Cr, Y is one or more of the elements Si, Al, As, Ga, Ge, Sn and Sb and X is one or more of the elements H, B, C, N, Li and Be.

In a further embodiment, the magnetocalorically active phase of the article consists essentially of, or consists of, this $(La_{1-a}M_a)(Fe_{1-b-c}T_bY_c)_{13-d}X_e$-based phase.

In further embodiments, the article comprises at least two or a plurality of magnetocalorically active phases, each having a different magnetic phase transition temperature $T_c$. The portion of the article is removed whilst the article remains at a temperature above the highest magnetic phase transition Temperature $T_c$ of the plurality of magnetocalorically active phases or below the lowest magnetic phase transition temperature $T_c$ of the plurality of magnetocalorically active phases.

The two or more magnetocalorically active phases may be randomly distributed throughout the article. Alternatively, the article may comprise a layered structure, each layer consisting of a magnetocalorically active phase having a magnetic phase transition temperature which is different from the magnetic phase transition temperature of the other layers.

In particular, the article may have a layered structure with a plurality of magnetocalorically active phases having magnetic phase transition temperatures such that the magnetic phase transition temperature increases along a direction of the article and, therefore, decreases in the opposing direction of the article. Such an arrangement enables the operating temperature of the magnetic heat exchanger in which the article is used to be increased.

If two or more magnetocalorically active phases are each associated with a phase change such as a change in length or volume, the portion of the article is removed while the article remains at a temperature either above or below the temperature range over which the phase change or phase changes occur.

The application also provides an article comprising at least one magnetocalorically active phase having a magnetic phase transition temperature $T_c$ manufactured using a method according to one of the embodiments described above.

The application also provides an article comprising at least one magnetocalorically active phase having a magnetic phase transition temperature $T_c$. At least one surface of the article comprises a machined finish. A machined surface is characteristic of the machining method used to produce the surface.

Structurally, the machined surface may have a roughness typical of the machining process. For example, a ground surface may be determined by a surface roughness typical for that produced by the grinding material and a wire erosion cut surface may have a plurality of generally parallel ridges extending along the length of the surface.

In an embodiment, at least one face of the article comprises a length of greater than 15 mm.

The application also provides for the use of an article manufactured by a method according to one of the previously described embodiments for magnetic heat exchange.

BRIEF DESCRIPTION OF THE DRAWINGS

Embodiments will be now be explained with reference to the drawings.

DETAILED DESCRIPTION OF SPECIFIC EMBODIMENTS

Figure 1:
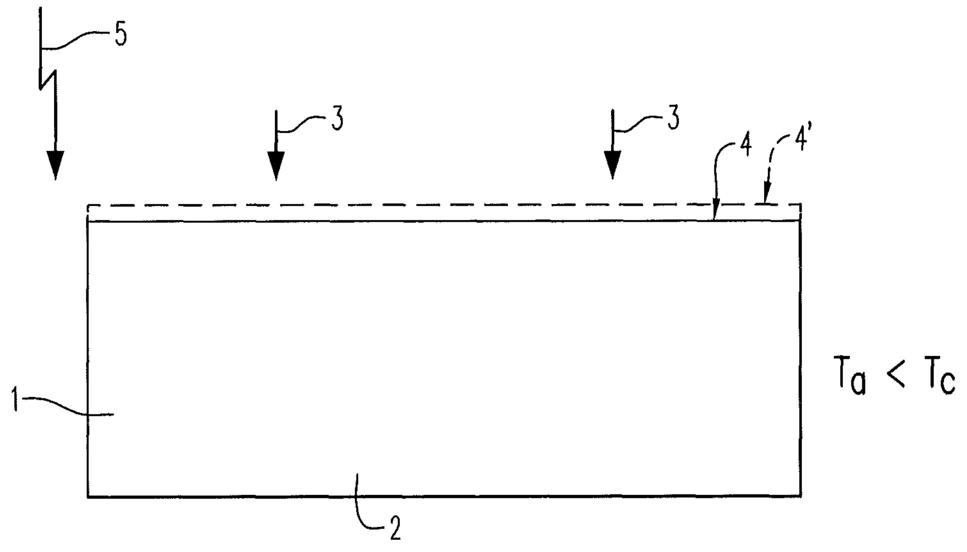
FIG. 1 illustrates schematically a method of working of an article comprising a magnetocalorically active phase by mechanical grinding and polishing according to a first embodiment.

FIG. 1 illustrates a method of working an article 1 comprising a magnetocalorically active phase 2. The magnetocaloritally phase 2 is a $La(Fe_{1-a-b}Co_aSi_b)_{13}$-based phase and has a magnetic phase transition temperature $T_c$ of 44° C. For this phase, the magnetic phase transition temperature may also be described as the Curie temperature as the phase undergoes a transition from ferromagnetic to paramagnetic.

In this embodiment, the article 1 is fabricated by powder metallurgical techniques. In particular, a powder mixture with an appropriate overall composition is compressed and reactively sintered to form the article 1. However, the method of working according to the present application may also be used for articles comprising one or more magnetocalorically active phases produced by other methods such as casting or sintering of precursor powders consisting essentially of the magnetocalorically active phase itself.

In the first embodiment, the article 1 is worked by mechanical grinding, indicated schematically in FIG. 1 by the arrows 3. In particular, FIG. 1 illustrates the mechanical grinding of an outer surface 4 of the article 1. The position of the outer surface 4 of the article 1 in the as-produced state is indicated by the dashed line 4' and the position of the outer surface 4 after working is indicated by the solid line. The surface 4 has a contour and roughness typical of a ground surface.

The working of the article 1 by grinding of the outside surfaces may be carried out to improve the surface finish and/or improve the dimensional tolerance of the article 1. Polishing may also be used to produce a finer surface finish.

It has been observed that the article 1 may contain cracks when it is removed from the furnace after reactive sintering. Crack formation was observed to be greater in larger articles, for example articles having a dimension of greater than 5 mm. It was observed that if the cooling rate over the temperature region of the Curie temperature is reduced crack formation in the article 1 can be avoided.

After sintering, the article was cooled within one hour from about 1050° C. to 60° C. which is slightly above the Curie Temperature of the magnetocalorically active phase of 44° C. Then the article 1 was slowly cooled from 60° C. to 30° C.

Without being bound by theory, it is thought that this crack formation during cooling of the article 1 to room temperature after reactive sintering is associated with the negative thermal expansion of the magnetocalorically active phase as the article 1 passes through its Curie temperature 44° C. By reducing the cooling rate as the magnetocalorically active phase passes its Curie temperature, cracks can be avoided due to the reduction of stress within the article 1.

According to the invention, the working of the article 1, in this embodiment, mechanical grinding and polishing, is carried out so that the temperature of the article $T_a$ during the working process remains below the Curie temperature $T_c$ of the magnetocalorically active phase, i.e. $T_a<T_c$.

The measures required to keep the temperature of the article 1 below the Curie temperature $T_c$ during the working may be selected on the basis of, among other parameters, the $T_c$ of the magnetocalorically active phase, the heat generated by the mechanical grinding and polishing and the ability of the article 1 itself to conduct heat away from the surface being ground.

A cooling means such as a cold liquid directed towards at least the surface 4 being worked may be used to control the temperature of the article 1 so that it is kept below the Curie temperature $T_c$. Cooling of the article 1 is indicated schematically in FIG. 1 by arrow 5. The article 1 may also be completely immersed in a liquid held at a temperature below the Curie temperature $T_c$.

The method of the first embodiment is, however, not limited to working by mechanical grinding and polishing. Other methods may be used to remove one or more portions of the article 1, for example, chemical mechanical polishing, spark erosion cutting and erosion wire cutting whilst the temperature of the article $T_a$ remains below $T_c$.

Furthermore, the article may be singulated into two or more separate pieces, one or more through-holes may be formed which extend from one side to another of the article or a channel may be formed in a surface of the article. The through-hole and channel may be adapted to direct cooling fluid when the article is in operation in a magnetic heat exchanger.

When using any method of working, the cooling of the article 1 is selected so that the temperature of the article 1 remains below and does not rise above the Curie temperature $T_c$ of the magnetocalorically active phase 2. The cooling required and the means of providing it may vary depending on the method of working selected since the heat generated and material removal rate may be different for different working methods as well as different depending on the working conditions used.

Figure 2:
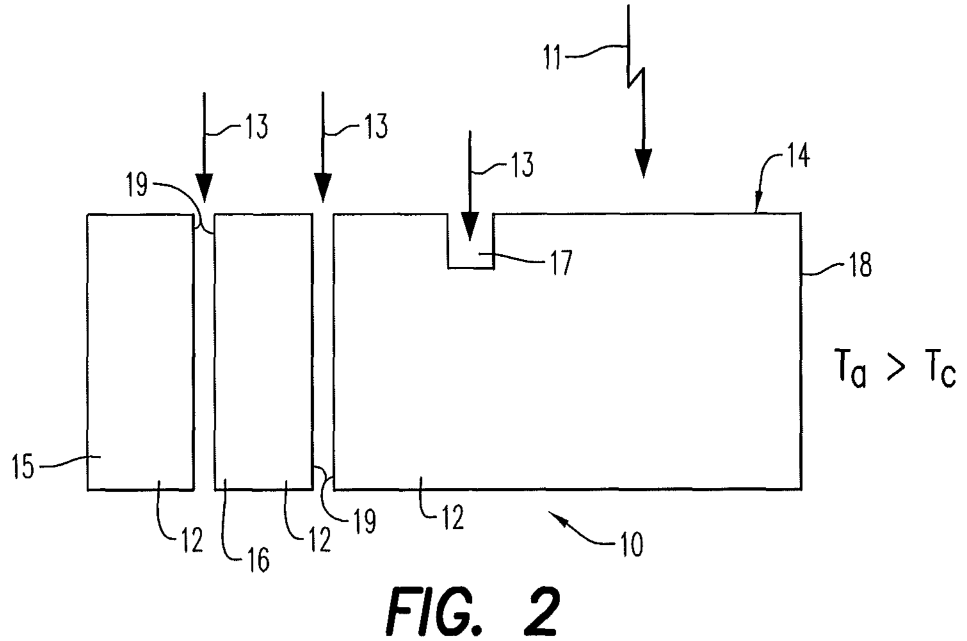
FIG. 2 illustrates schematically a method of working of an article comprising a magnetocalorically active phase by wire erosion cutting according to a second embodiment.

FIG. 2 illustrates a method of working an article 10 having outer surface 14 comprising a magnetocalorically active phase 12 according to a second embodiment. As in the first embodiment, the method by which the article 10 is fabricated is unimportant.

The method of the second embodiment is illustrated in FIG. 2 using the technique of wire erosion cutting indicated schematically with the arrows 13 to work the article 10. However, the method of second embodiment is not limited to wire erosion cutting and other methods of working as mentioned above may also be used.

To avoid crack formation during cooling of the article 10 after reactive sintering, the article 10 can be cooled below $T_c$ slowly for intermediate storage. In this embodiment, the article 10 is worked at temperatures above $T_c$ and the article 10 is heated above $T_c$ once again before working the article 10.

The cooling rate to the storage temperature as well as the heating rate to reach the working temperature are selected to be slow enough to avoid cracking when the article 10 passes through the Curie temperature $T_c$.

The cooling rate and heating rate required to avoid crack formation also depend on the size of the article. The cooling and heating rate should be increasingly reduced for increasingly larger articles.

In the method of the second embodiment, the temperature of the article 10 $T_a$ is maintained at temperatures above the Curie temperature $T_c$ of the magnetocalorically active phase 12 throughout the entire working process, i.e. $T_a>T_c$. When using a wire erosion cutting technique, the temperature of the article 10 may be maintained at temperatures above the Curie temperature by heating the fluid in which the article 10 is immersed during the wire cutting process. Heating is indicated schematically in FIG. 2 by the arrow 11.

Depending on the thermal capacity of the fluid, it may be possible to heat the article to a temperature above the Curie temperature before wire erosion cutting and allow the thermal capacity of the bath to provide the necessary temperature without applying additional heat from an external source during working.

Wire erosion cutting may be used to singulate the article 10 to form one or more separate portions, in this embodiment, slices 15, 16 as well as to form one or more channels 17 in one or more faces 18, of the article 10.

The side faces 19 of the slices 15, 16 as well as the faces forming the channel 17 have a wire-erosion cut surface finish. These surfaces comprise a plurality of ridges extending in directions parallel to the direction in which the wire cut through the material.

The channel 17 may have dimensions and be arranged in the face 18 so as to direct the flow of a heat exchange fluid during operation of a magnetic heat exchanger in which the article 10 or portions of the article 10 provide the working medium.

Figure 3:
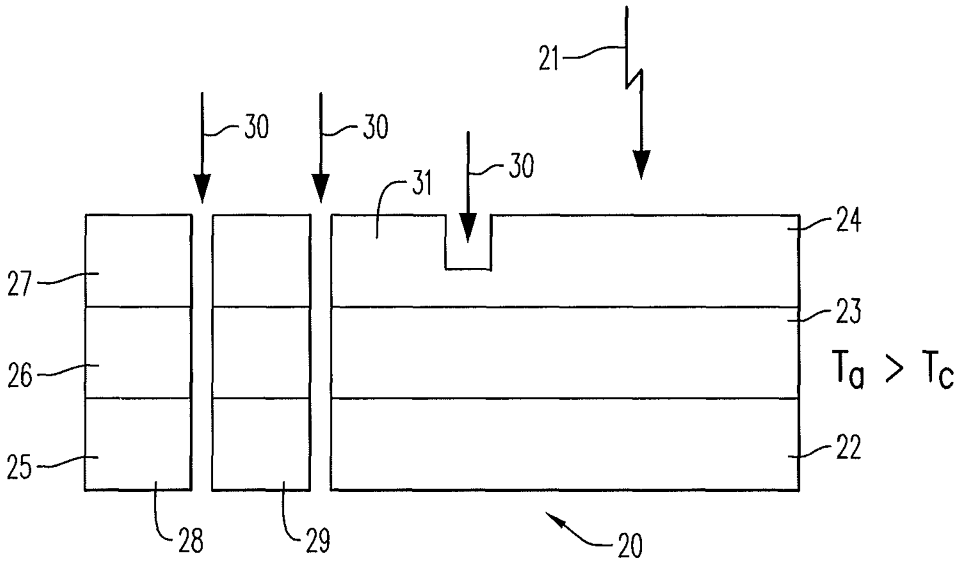
FIG. 3 illustrates schematically a method of working of an article comprising a plurality of magnetocalorically active phases by wire erosion cutting according to a third embodiment.

FIG. 3 illustrates a method of working an article 20 comprising a plurality of magnetocalorically active phases 22, 23 and 24. The article 20 has a layered structure, each layer 25, 26, 27 comprising a magnetocalorically active phase having a different $T_c$. In this embodiment, the first layer 25 comprises a magnetocalorically active phase 22 with a $T_c$ of 3° C., the second layer 26 is positioned on the first layer 25 and comprises a magnetocalorically active phase 23 having a $T_c$ of 15° C. and the third layer 27 is arranged on the second layer 26 and comprises a magnetocalorically active phase 24 with a $T_c$ of 29° C.

In the method according to the third embodiment, portions of the article 20 are removed whilst the temperature of the article Ta remains above the highest Curie temperature of the magnetocalorically active phases present in the article 20. Furthermore, in the third embodiment, the article 20, after its production and before working is carried out, is held at temperatures above the highest Curie temperature of the plurality of magnetocalorically active phases, in this embodiment, the $T_c$ of 29° C. of the third layer 27. The article 20 is first allowed to cool below the highest Curie temperature, in this embodiment 29° C., after all working has been completed.

This may be achieved by removing the as-produced article 20 from the furnace in which it was sintered at a temperature above the highest $T_c$ and transferring it to a further warming oven while maintaining the temperature above the highest Curie temperature $T_c$. In a further embodiment, the article 20 is left in the furnace in which it was produced at a dwell temperature above the highest Curie temperature $T_c$. Heating is indicated schematically in FIG. 3 by the arrow 21.

In embodiment illustrated in FIG. 3, the article 20 is singulated into a plurality of slices 28, 29 by wire erosion cutting, indicated schematically by the arrows 30. The production of a third slice 31 is also illustrated in FIG. 3 before singulation is completed.

If the article is further worked, for example, by providing a protective coating, this further working may also be carried out at temperatures either above or below the Curie temperature. If the method of the third embodiment is used, the protective coating may also be applied at temperatures above the Curie temperature without the temperature of the article 20, $T_a$ that is the slices 28, 29, 31 and so on, being allowed to fall below the highest Curie temperature of the plurality of magnetocalorically active phases.

The methods illustrated in FIGS. 1 and 2 and their alternatives may also be carried out on an article comprising a plurality of magnetocalorically active phases. The plurality of magnetocalorically active phases may be arranged in a layered structure in the article but may also have other arrangements in the article, for example, be randomly arranged in the article.

The article may also comprise magnetocalorically passive phases. The magnetocalorically passive phases may be provided in the form of a coating of the grains of the magnetocalorically active phase which acts as a protective coating and/or corrosion resistant coating, for example.

A combination of different working methods may be used to manufacture a final product from the as-produced article. For example, the as-produced article could be ground on its outer surfaces to produce outer dimensions with a tight manufacturing tolerance. Channels may then be formed in the surface to provide cooling channels and afterwards the article singulated into a plurality of finished articles. The different working methods are, however, carried out whilst the temperature of the article remains above or below the magnetic phase transition temperature $T_c$, or if the article comprises a plurality of magnetocalorically phases of differing $T_c$, at temperatures above or below the highest $T_c$ or lowest $T_c$, respectively.

Without being bound by theory, it is thought that by keeping the article at temperatures either below, or above the magnetic phase transition temperature during working, a phase change which occurs at temperatures in the region of the magnetic phase transition temperature fails to occur during working and any tension which may be associated with the phase change is avoided. By avoiding tension during working due to a phase change, cracking or splitting of the article during working can be avoided.

Additionally, and still without be bound by theory, it is thought that by maintaining the article at temperatures either below or above the magnetic phase transition temperature during working, a change in volume of the magnetocalorically active phase which occurs at temperatures in the region of the magnetic phase transition temperature is avoided. Without being bound by theory, it is thought that cracking and splitting of the article during working is prevented by preventing the change in length of the lattice parameter by preventing a change in volume during working.

The magnetocalorically active phase may also undergo a phase change over a temperature range above and below the magnetic phase transition temperature or have a temperature dependent change in length of volume at temperatures near to the magnetic phase transition temperature. The portion of the article including such a magnetocalorically active phase may be removed at temperatures either above or below the temperature range over which the phase change occurs.

Magnetocalorically active phases such as $La(Fe_{1-a-b}Si_aCo_b)_{13}$ have been demonstrated to display a negative volume change at temperatures above the Curie temperature. Articles comprising these phases have been successfully worked using the methods described herein.

It has been observed that a large block comprising a magnetocalorically active phase of $La(Fe_{1-a-b}Si_aCo_b)_{13}$ could be singulated to form a plurality of slices having a thickness of 0.6 mm by performing the wire erosion cutting at a temperature above the Curie temperature of the block. In contrast, slices of this thickness could not be produced without cracks if the wire erosion was carried out under normal conditions in which the cooling medium was held at 20° C.

A specific example and a comparison will now be described.

EXAMPLE

A sintered block comprising a magnetocalorically active phase with a silicon content of 3.5 weight percent, a cobalt content of 7.9 weight percent, a lanthanum content of 16.7 weight percent, balance iron and a Curie temperature of 29° C. was produced using a powder sintering technique. The block was worked by wire erosion. The cooling fluid was heated to 50° C. which is above the Curie temperature 29° C. of the block and the wire erosion cutting carried out at this temperature. A plurality of slices with a thickness of 0.6 mm (millimeters) were produced. Cracks were not observed in the singulated slices.

Comparison Example

As a comparison, the same block subjected to working by wire erosion cutting whilst the temperature of the cooling fluid in the wire erosion machine was set to 20° C., which is slightly less than the Curie temperature of 29° C. It was observed that a cylinder-shaped constricted region had formed around the cutting wire and cracks had formed extending in directions perpendicular to the cutting wire.

It is thought that within this cylinder-shaped region the local temperature of the material is raised above its Curie temperature whereas outside this region the temperatures remained below $T_c$. Due to the large negative thermal expansion of around −0.4% of the magnetocalorically active phase when passing through $T_c$, large stresses are generated in the vicinity of the erosion wire which lead to the observed cracks. Homogenous crack-free slices having a thickness of 0.6 mm could not be produced.

The invention having been thus described with reference to certain specific embodiments and examples thereof, it will be understood that this is illustrative, and not limiting, of the appended claims.

The invention claimed is:

1. A method of working an article comprising a magnetocalorically active phase, comprising:

providing an article comprising at least one magnetocalorically active phase having a magnetic phase transition temperature $T_c$, and removing at least one portion of the article whilst the article remains at a temperature above the magnetic phase transition temperature $T_c$ or below the magnetic phase transition temperature $T_c$.

2. The method according to claim 1, further comprising heating the article whilst removing the portion of the article.

3. The method according to claim 2, wherein the heating of the article whilst removing the portion of the article prevents the magnetocalorically active phase from undergoing a phase change.

4. The method according to claim 1, further comprising maintaining the article at a temperature above its magnetic phase transition temperature $T_c$ after the formation of the magnetocalorically active phase until working of the article has been completed.

5. The method according to claim 1, further comprising coating the article whilst removing the portion of the article.

6. The method according to claim 5, wherein the cooling of the article whilst removing the portion of the article prevents the magnetocalorically active phase from undergoing a phase change.

7. The method according to claim 1, wherein the removing of the at least one portion of the at least one article comprises machining.

8. The method according to claim 1, wherein the removing of the at least one portion of the article comprises mechanical grinding, mechanical polishing, or chemical-mechanical polishing.

9. The method according to claim 1, wherein the removing of the at least one portion of the article comprises electric spark cutting or wire erosion cutting.

10. The method according to claim 1, wherein the removing of the portion of the article singulates it into two separate pieces.

11. The method according to claim 1, wherein the removing of the portion of the article comprises forming at least one channel in a surface of the article or forming at least one through-hole in that article.

12. The method according to claim 1, wherein the magnetocalorically active phase exhibits a temperature dependent transition in length or volume and wherein the removing of the at least one portion occurs at a temperature above the transition or below the transition.

13. The method according to claim 12, wherein the temperature dependent transition in length or volume is characterized by the expression $(L_{10\%}-L_{90}\%)\times100/LT>0.2$ wherein $L_{10\%}$ is the length of the article at 10% of the maximum length change, $L_{90\%}$ is the length of the article at 90% of the maximum length change, L is the length of the article at a temperature below the transition, and T is the temperature of the article.

14. The method according to claim 1, wherein the magnetocalorically active phase exhibits a negative linear thermal expansion for increasing temperatures.

15. The method according to claim 1, wherein the magnetocalorically active phase comprises a $NaZn_{13}$-type structure.

16. The method according to claim 1, wherein the magnetocalorically active phase consists essentially of a $(La_{1-a}M_a)(Fe_{1-b-c}T_bY_c)_{13-d}X_e$-based phase, wherein $0\leq a\leq0.9$, $0\leq b\leq0.2$, $0.05\leq c\leq0.2$, $-1\leq d\leq+1$, $0\leq e\leq3$, M is one or more of the elements Ce, Pr and Nd, T is one or more of the elements Co, Ni, Mn and Cr, Y is one or more of the elements Si, Al, As, Ga, Ge, Sn and Sb and X is one or more of the elements H, B, C, N, Li and Be.

17. The method according to claim 16, wherein the magnetocalorically active phase (2) consists of a $(La_{1-a}M_a)(Fe_{1-b-c}T_bY_c)_{13-d}X_e$-based phase.

18. The method according to claim 1, wherein the article comprises a plurality of magnetocalorically active phases, each having a different magnetic phase transition temperature $T_c$, wherein the portion of the article is removed whilst the article remains at a temperature above the highest magnetic phase transition temperature $T_c$ of the plurality of magnetocalorically active phases or below the lowest magnetic phase transition temperature $T_c$ of the plurality of magnetocalorically active phases.

19. The method according to claim 1, wherein the article comprises at least two magnetocalorically active phases, each having a different magnetic phase transition temperature $T_c$, wherein the portion of the article is removed whilst the article remains at a temperature above the highest magnetic phase transition Temperature $T_c$ of the at least two magnetocalorically active phases or below the lowest magnetic phase transition temperature $T_c$ of the at least two magnetocalorically active phases.

20. A method of magnetic heat exchange comprising contacting a heat sink or source with an article manufactured by the method of claim 1.

* * * * *